Patented Sept. 19, 1950

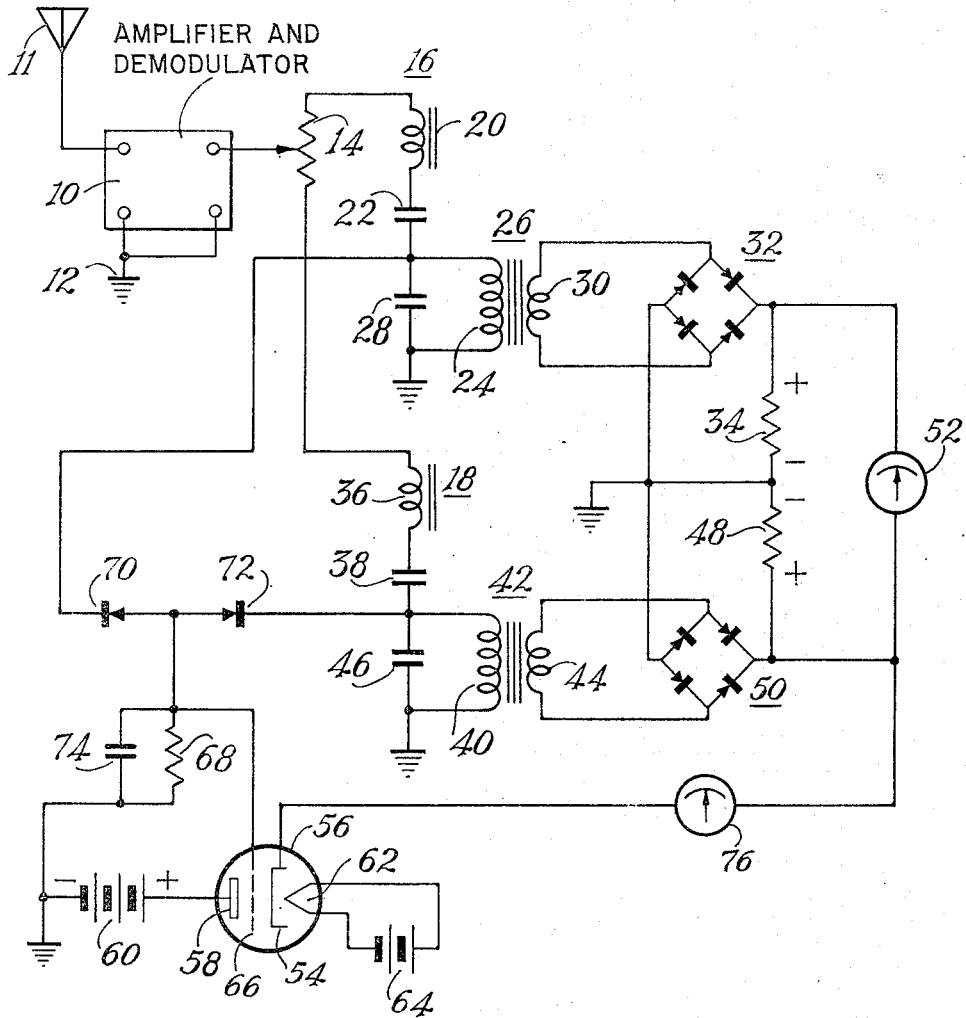

2,522,914

UNITED STATES PATENT OFFICE 2,522,914

WARNING SYSTEM FOR BALANCE INDICATORS

Henry T. Winchel and Clarence A. Addis, Los Angeles, Calif., assignors to Bendix Aviation Corporation, South Bend, Ind., a corporation of Delaware Application February 21, 1944, Serial No. 523,304

6 Claims. (Cl. 343—108)

1

This invention relates to differential voltmeters indicating the differences in potentials existing in two circuits, and more particularly to such a voltmeter in which a warning indication is given when the voltages under measurement are too small to provide reliable indications.

Among the present radio aids to navigation there is a class in which differently modulated intermeshing directional radiation patterns are employed for the guidance of aircraft on predetermined paths through space. Such systems may be used either to provide vertical definition of a path, as in blind landing apparatus, or to provide lateral definition of a path, as in the various forms of the radio range. In a frequently encountered blind landing arrangement the upper radiation lobe is modulated at 90 cycles per second and the lower radiation lobe is modulated at 150 cycles per second, and the equisignal plane is followed to bring the aircraft to a safe landing when visibility is obscured or non-existent.

A radio receiver actuated by the energy in both patterns is carried on the aircraft and supplies in its output circuit energy at both the 90 cycle and 150 cycle frequency. This energy is separated and applied to two channels by the connection of appropriate filters to the output of the receiver and the resultant divided energies are separately rectified and applied to the two sides of a zero center direct current indicating instrument with like polarity. So long as the voltages applied to the two sides of the instrument are equal in magnitude, the zero center position of the pointer is not disturbed. Should the 90 cycle energy predominate, the pointer moves over to the side indicating that the rate of descent should be increased, and if the 150 cycle energy predominates, an opposite deflection of the pointer results, indicating that the rate of descent is to be decreased. By following the instrument indications and piloting the aircraft in accordance therewith, the operator of the craft is thus able to follow the equisignal plane to the earth. It is to be noted, however, that in the entire absence of any signal stimulus, no difference in potential appears across the balance indicator and an on-course indication is observed, so that if the pilot attempts to use the apparatus while too remote from the transmitting location he may put the plane in position for a normal descent and ultimately crash as no indication is provided that he is not in position for the approach. The glide indicator delivers an on-course indication both when the craft is on the correct approach path and when in a signal field strength insufficient to control the indicator. While it is possible and, in some cases, has been the practice to provide for metering of the signal voltages to apprise the pilot of the no-signal condition, this merely adds to the confusing maze of instruments now confronting the pilot and the proper correlation of the various instrument readings is in no wise assured.

Accordingly, a principal object of the invention is to provide new and novel glide path indicating apparatus giving directions of a safe nature in the absence of actuating signal.

Another object of the invention is to provide new and novel glide path indicating apparatus in which the pilot is directed away from the ground during the absence of actuating signal.

Still another object of the invention is to provide new and novel glide path indicating apparatus in which a single instrument provides the no-signal indication and the normal glide path readings.

Yet another object of the invention is to provide new and novel differential voltage indicating apparatus in which the indications are unbalanced when the impressed voltages do not fall within a predetermined range.

A further object of the invention is to ease the task of the pilot in guiding an aircraft safely to a landing during conditions of poor visibility.

The above objects and advantages of the invention are substantially accomplished by separately rectifying the energy at the two frequencies occurring in the output of a radio receiver in differently modulated intermeshing field patterns, applying said energy to the two sides of a balance indicator in like sense, connecting one side of the balance indicator to the cathode of a vacuum tube whose anode is supplied from an auxiliary source of power, and applying a negative potential controlled by the larger of the energy levels in the receiver output to the control grid of said vacuum tube.

Other objects and advantages of the invention will in part be disclosed and in part be obvious when the following specification is read in conjunction with the drawing, which is a schematic diagram of a differential voltmeter embodying the invention.

The particular arrangement shown is adapted for the location of the glide path in the earlier described intermeshing radiation lobes but it is at once evident that the system may be of value in any differential voltage responsive system where it is desired to render the response asymmetrical in the absence of a sufficiently strong input.

Referring now to the drawing, there is shown the amplifier and demodulator 10 connected to the antenna 11 and ground 12. This antenna and ground system delivers voltages to the input of the receiver 10 indicative of the position of the apparatus in the aforementioned intermeshing radiation patterns which may consist of an upper lobe of high frequency energy modulated at 90 cycles per second and a lower lobe of high frequency energy modulated at 150 cycles per second. The receiver 10 may be of any suitable type capable of delivering an output corresponding to the modulations on the high frequency signals impressed thereon. The output of receiver 10 is connected at one side to ground and at the other side to the movable tap on the resistor 14.

The two ends of the resistor 14 are connected respectively to the 90 cycle filter 16 and the 150 cycle filter 18. In filter 16, the inductor 20 and capacitor 22 are selected and connected to series resonate at 90 cycles per second and serve to connect the one end of resistor 14 with the primary winding 24 of the impedance transformer 26 which is parallel resonated for 90 cycle per second currents with the shunt capacitor 28. The remaining terminal of winding 24 is grounded. A step down winding 30 may be provided as the secondary of transformer 26, and the filter output transformer 26 thus provides filtered 90 cycle output voltage at a high impedance level across primary 24 and at a low impedance level across secondary 30. A bridge connected rectifier assembly 32 may be connected across winding 30 and the direct current output thereof impressed on the resistor 34 having one end connected to ground. In the arrangement shown, the negative terminal is grounded.

The other end of resistor 14 feeds energy through the inductor 36 and capacitor 38 series resonated at 150 cycles per second and the primary winding 40 of the transformer 42 to ground. The transformer 42 is provided with the step down winding 44 and is resonated at 150 cycles per second by the capacitor 46. These elements comprise the filter 18 and there is available from this unit filtered 150 cycle per second energy at high impedance level across primary 40 and at a low impedance level across the secondary 44. Winding 44 feeds current to the resistor 48 through the full wave bridge connected rectifier assembly 50, the negative terminal of said resistor being grounded. Indications are provided by the zero-center direct current instrument 52 connected between the ungrounded terminals of the resistors 34 and 48.

The biasing of the operation of the balance indicator 52 in the absence of adequate signal input is secured by connecting the cathode 54 of the vacuum tube 56 to the ungrounded terminal of resistor 48 and the anode 58 of tube 56 to the positive terminal of the source 60 having the negative terminal thereof grounded. A heater 62, associated with cathode 54, is energized from the current source 64. The vacuum tube 56 is also provided with a control grid 66 intermediate cathode 54 and anode 58 which grid is connected to one terminal of the resistor 68 whose other terminal is grounded. The grid terminal of resistor 68 is connected with the ungrounded terminal of transformer primary 24 through the half-wave rectifier 70 having its negative terminal adjacent resistor 68; and with the ungrounded terminal of transformer primary 40 through the half-wave rectifier 72 whose negative terminal is also adjacent resistor 68. Excessive pulsations in the voltage across resistor 68 are minimized by the capacitor 74 shunted across the resistor 68. For additional convenience in some installations, it may prove advantageous to insert the current indicator 76 in the line extending from the cathode 54 to resistor 48.

The operation of the apparatus may be readily understood from the following description of the initial adjustment and use of the equipment: Let a signal corresponding to the on-course indication be impressed on the antenna 11, under which condition no difference in voltage should appear across the terminals of the meter 52. Filter 16, with rectifier 32, produces across resistor 34 a voltage proportional to the 90 cycle energy content of the filter input, and filter 18, with rectifier 50, produces across resistor 48 a voltage proportional to the 150 cycle energy content of the input to this filter. It is assumed that the impressed signal is sufficiently strong so that the presence of the vacuum tube 56 may be neglected. Under the stated conditions, any difference in the attenuation of the two filters will appear as a difference in the voltages across resistor 34 and resistor 48, causing a deflection of the meter 52. These differences in attenuation are neutralized by adjustment of the tap on resistor 14 to the position at which the meter 52 is not deflected, and the apparatus is thus prepared for operation. With the signal level mentioned, the action of rectifiers 70 and 72 produces a negative voltage on the control grid of the tube 56 even larger than the voltages across resistors 34 and 48, because of the connection of the rectifiers to a high impedance point on the filters. Consequently, the voltage on the control grid 66 may considerably exceed that from either side of the meter 52 to ground. This negative potential, acting in conjunction with the positive bias placed on cathode 54 by its connection to resistor 48, blocks the flow of current between the anode 58 and cathode 54 of the tube 56 and prevents the presence of the tube 56 from having any effect on the operation of meter 52.

Should the voltages at the selected frequency in the output of the receiver vanish or decrease unduly, the voltages across resistors 34 and 48 decrease simultaneously with a decrease in the negative bias appearing on control grid 66, thereby removing a large part of the blocking bias and permitting current to flow from the positive terminal of the battery 60 through vacuum tube 56, meter 76 and the load resistor 48 to ground and the negative terminal of battery 60. This makes the ungrounded terminal of resistor 48 positive with respect to the ungrounded terminal of resistor 34 to produce a deflection of the balance indicator 52. This deflection is of the same sign as that caused by a predominance of the voltage selected by the filter 18 and therefore, in very weak fields, the pilot's glide path indicator 52 is actuated in a manner identical with the effect produced by a predominance of 150 cycle energy. The apparatus normally directs the pilot to adjust the attitude of craft upwardly when the 150 cycle energy predominates, since this is the modulation characteristic of the lower radiation lobe, and it is evident from the above that in the absence of signals of suitable strength the pilot is instructed by the indications of the balance indicator 52 to direct the craft upwardly away from the ground. The pilot may consequently rely solely and entirely on the data supplied by the indicator 52 with the assurance that it can never deliver an on-course indication except when the craft is actually in the intended glide-path, and that at all other times its indications will be of a nature preventing undesired contact with the earth.

It may be necessary, for operational purposes, that the navigator know the time at which the aircraft enters the glide-path field, and under these circumstances the meter 76 may be included as earlier outlined and physically located adjacent the navigator's position. Current flows through meter 76 at all times except when the aircraft is located within the glide field. Thus the time when the current falls to zero may be taken as the time of arrival.

Although the apparatus has been described as specifically applied to the problem of providing safe glide path indications for aircraft, it will be at once recognized as of value in any application in which the operation of a balance indicator is to be rendered asymmetrical when the input voltage is so low that reliable indications cannot be guaranteed. The configuration described is a highly efficient one, the large grid voltages required being developed in a high impedance circuit, while the lower voltages needed for the operation of the indicator 52 are developed in a low impedance circuit. For this reason, resistors 34 and 48 may desirably be selected larger than resistor 68 to realize this efficiency.

It will be obvious that many changes and modifications may be made in the invention without departing from the spirit thereof as expressed in the foregoing description and in the appended claims.

We claim:

1. In differential voltage responsive apparatus, a first source of measured potential, a second source of measured potential, a terminal common to each of said sources, indicating means connected between other terminals on each of said sources, a source of direct current having positive and negative terminals, means connecting said negative terminal and said common terminal, an electric discharge device having a cathode, a control grid and an anode, means connecting said cathode and one of said other source terminals, means connecting said anode and said positive source terminal, means for deriving a control potential proportional to the greater of said measured potentials, and means for impressing said control potential on said control grid.

2. In differential voltage responsive apparatus, a first and second impedance, a terminal common to each of said impedances, means for impressing energy from a first source on one of said impedances, means for impressing energy from a second source on the other of said impedances, indicating means connected between an independent terminal on said first impedance and an independent terminal on said second impedance, a source of direct current having positive and negative terminals, means connecting said negative terminal and said common terminal, an electric discharge device having a cathode, a control grid and an anode, means connecting said cathode and said independent terminal of said first impedance, means connecting said anode and said positive source terminal, means for deriving a control potential proportional to the greater of said impressed energies, and means for impressing said control potential on said control grid.

3. In differential voltage responsive apparatus, a first source of alternating current energy, a second source of alternating current energy, a first resistor, a second resistor, rectifier means connecting said first source and said first resistor, rectifier means connecting said second source and said second resistor, means connecting a first terminal of said first resistor with a first terminal of said second resistor, indicating means connected between a second terminal of said first resistor and a second terminal of said second resistor, a source of direct current potential having positive and negative terminals, means connecting said negative terminal and said first resistor terminals, a controllable impedance connected between said positive terminal and one of said second resistor terminals, and means responsive to the greater energy level in said alternating current sources for regulating said controllable impedance.

4. In differential voltage responsive apparatus, a first source of alternating current energy, a second source of alternating current energy, a first resistor, a second resistor, rectifier means connecting said first source and said first resistor, rectifier means connecting said second source and said second resistor, means connecting a first terminal of said first resistor with a first terminal of said second resistor, indicating means connected between a second terminal of said first resistor and a second terminal of said second resistor, a source of direct current potential having positive and negative terminals, an electric discharge device having a cathode, a control grid and an anode, means connecting said cathode and one of said second resistor terminals, means connecting said anode and said positive source terminal, and means for impressing on said control grid a negative potential proportional to the greater of the energy levels in said alternating current sources.

5. In electrical measuring apparatus, a source delivering electrical energy at a plurality of frequencies at its output terminals, a first filter means passing energy within a first predetermined frequency range connected to said output terminals, a second filter means passing energy within a second predetermined frequency range connected to said output terminals, a first resistor, a second resistor, rectifier means connecting the output of said first filter means to said first resistor, rectifier means connecting the output of said second filter means to said second resistor, means connecting a first terminal of said first resistor with a first terminal of said second resistor, indicating means connected between a second terminal of said first resistor and a second terminal of said second resistor, a source of direct current potential having positive and negative terminals, an electric discharge device having a cathode, a control grid and an anode, means connecting said cathode and one of said second resistor terminals, means connecting said anode and said positive source terminals, and rectifier means connected between the output of said first and second filter means and said control grid.

6. In electrical measuring apparatus, a source delivering electrical energy at a plurality of frequencies at its output terminals, a first filter means passing energy within a first predetermined frequency range and having output terminals at high and low impedance levels, means connecting said first filter means to the output terminals of said source, a second filter means passing energy within a second predetermined frequency range and having output terminals at high and low impedance levels, means connecting said second filter means to the output terminals of said source, a first resistor, a second resistor, rectifier means connecting the low impedance output terminals of said first filter means to said first resistor, rectifier means connecting the low impedance output terminals of said second filter means to said second resistor, means connecting a first terminal of said first resistor with a first terminal of said second resistor, indicating means connected between a second terminal of said first resistor and a second terminal of said second resistor, a source of direct current having positive and negative terminals, means connecting said negative terminal and said first resistor terminals, an electric discharge device having a cathode, a control grid and an anode, means connecting said cathode and one of said second resistor terminals, means connecting said anode and said positive source terminal, a load impedance, means connecting one terminal of said load impedance and said negative source terminal, rectifier means connecting the other terminal of said load impedance and the high impedance output terminal of said first filter means, rectifier means connecting said other terminal of said load impedance and the high impedance output terminal of said second filter means, and means connecting said control grid to said other terminal of said load impedance.

HENRY T. WINCHEL.
CLARENCE A. ADDIS.

REFERENCES CITED

The following references are of record in the file of this patent:

UNITED STATES PATENTS

| Number | Name | Date |
|---|---|---|
| 1,787,992 | McIlvaine | Jan. 6, 1931 |
| 1,867,264 | Hyland | July 12, 1932 |
| 1,958,258 | Alexanderson | May 8, 1934 |
| 2,171,561 | Hooven | Sept. 6, 1939 |
| 2,317,400 | Paulus et al. | Apr. 27, 1943 |
| 2,350,835 | Sias | June 6, 1944 |
| 2,354,618 | Sias | July 25, 1944 |

FOREIGN PATENTS

| Number | Country | Date |
|---|---|---|
| 524,526 | Great Britain | Aug. 8, 1940 |